United States Patent
Lodi

(10) Patent No.: US 9,333,987 B2
(45) Date of Patent: May 10, 2016

(54) SUPPORT FOR A MUDGUARD

(71) Applicant: LODI S.R.L., Fabbrico (IT)

(72) Inventor: Luigi Lodi, Fabbrico (IT)

(73) Assignee: LODI S.P.A., Fabbrico (IT)

( * ) Notice: Subject to any disclaimer, the term of this patent is extended or adjusted under 35 U.S.C. 154(b) by 0 days.

(21) Appl. No.: 14/677,425

(22) Filed: Apr. 2, 2015

(65) Prior Publication Data

US 2015/0284030 A1    Oct. 8, 2015

(30) Foreign Application Priority Data

Apr. 8, 2014   (IT) .............................. MO2014A0095

(51) Int. Cl.
| | |
|---|---|
| *A47B 96/06* | (2006.01) |
| *A47F 5/00* | (2006.01) |
| *A47F 5/08* | (2006.01) |
| *B62D 25/16* | (2006.01) |

(52) U.S. Cl.
CPC ............ *B62D 25/163* (2013.01); *B62D 25/168* (2013.01)

(58) Field of Classification Search
CPC .. B62D 25/182; B62D 25/188; B62D 25/163; B62D 25/168; B60Q 1/30
See application file for complete search history.

(56) References Cited

U.S. PATENT DOCUMENTS

| | | | | | |
|---|---|---|---|---|---|
| 3,782,757 | A | * | 1/1974 | Juergens .............. | B62D 25/163 280/851 |
| 3,934,901 | A | * | 1/1976 | Hammerly ........... | B62D 25/188 280/851 |
| 9,027,983 | B2 | * | 5/2015 | Butler .................. | B62D 35/001 280/847 |

FOREIGN PATENT DOCUMENTS

| | | |
|---|---|---|
| DE | 74 33 498 U | 5/1975 |
| DE | 87 08 265 U1 | 9/1987 |
| DE | 91 13 341 U1 | 1/1992 |
| EP | 0 850 820 A1 | 7/1998 |
| EP | 1 209 067 A1 | 5/2002 |
| EP | 2 657 109 A2 | 10/2013 |
| EP | 2 666 702 A1 | 11/2013 |

* cited by examiner

*Primary Examiner* — Amy Sterling
(74) *Attorney, Agent, or Firm* — Pearne & Gordon LLP

(57) ABSTRACT

The invention relates to an improved support for a mudguard. The support at hand comprises an L-shaped arm (1) to which an arcuate support (2) is fastened and the mudguard is connected to the arcuate support (2); a removable fastening means is provided and makes it possible to fasten the arcuate support (2) to the arm (1) in a position chosen from among a plurality of different positions of the support (2).

4 Claims, 2 Drawing Sheets

SUPPORT FOR A MUDGUARD

The object of the present invention is an improved support for a mudguard.

In particular, the invention refers to a support for a mudguard of a farm vehicle, such as a tractor.

Wheeled farm tractors are provided with wheels, which, in many cases, are equipped with mudguards. The mudguard is connected to a wheel by means of a support, located on the internal side of the wheel and equipped with an L-shaped arm that supports the mudguard over the same wheel. A first end of the L-shaped arm is connected to the frame of the tractor in various known manners; an arcuate bar normally realized using a metal section bar is fastened at the other end of the L-shaped arm, and the mudguard is fastened above the arcuate bar. To increase the strength of the arcuate bar, rectilinear lengths are often provided, welded inferiorly to the arcuate bar so as to form a polygonal reinforcement structure, with the welding normally being carried out in the corners of the reinforcement polygon.

A prior-art support of this type is for example described in patent application EP2666702 filed by the same applicant.

According to the ground over which it is moving, the speed, direction and sense of motion of the tractor, the protection provided by the mudguard may prove to be insufficient in the front part or in the rear part of the wheel. Moreover, rectilinear lengths of considerable thickness and weight are often needed in order to achieve effective reinforcement of the arcuate bar.

The aim of the present invention is to offer an improved support for a mudguard that makes it possible to overcome the drawbacks of the supports currently available on the market.

One advantage of the support according to the present invention is to increase the protection provided by the mudguard under all operating conditions of the tractor, and to be stronger than currently available supports.

Another advantage of the support according to the present invention is that it can be used in place of currently available supports without requiring particular adjustment work on the vehicles.

Further characteristics and advantages of the support for a mudguard according to the present invention will become clearer from the following description, provided by way of non-limiting example, with reference to the attached figures, wherein FIG. 1 shows a side view of the support for a mudguard according to the present invention;

Figure 1:
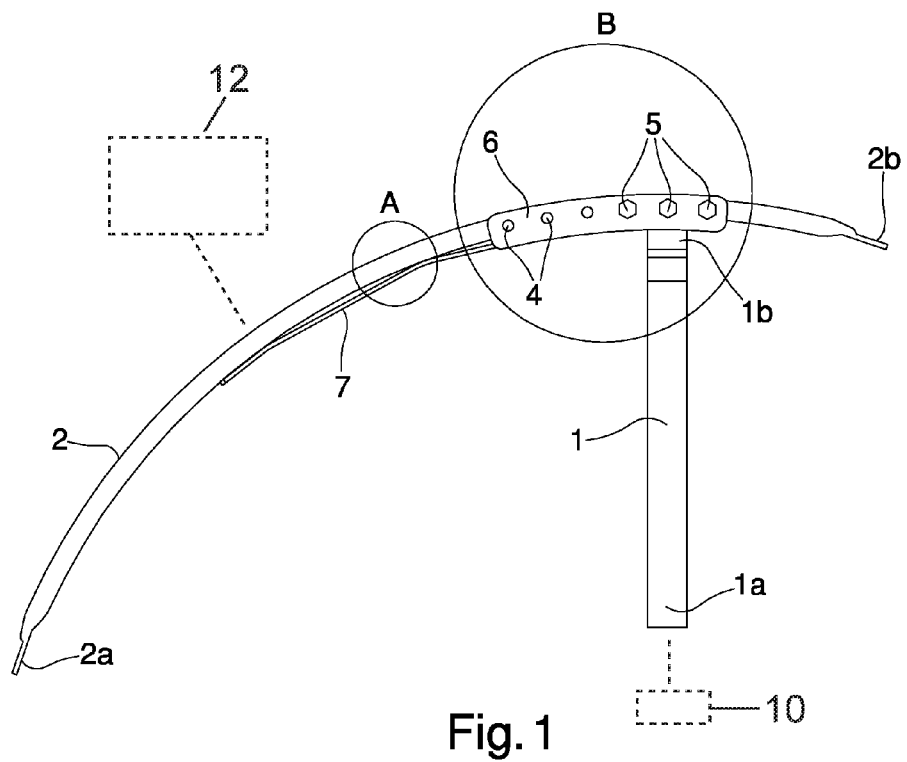
Figure 2:
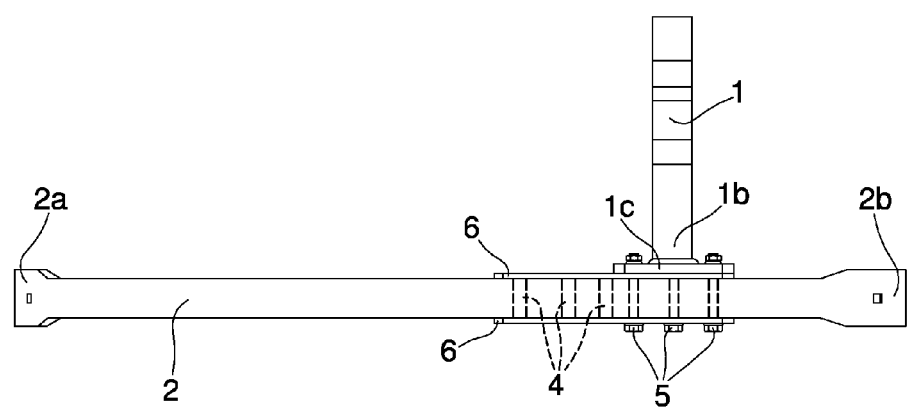
FIG. 2 shows a top view of the support for a mudguard according to the present invention.
Figure 3:
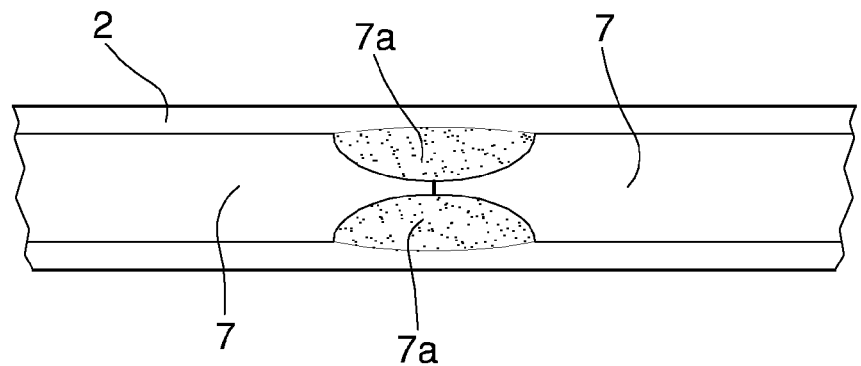
FIG. 3 shows an enlarged bottom view of a detail A of FIG. 1 regarding the welding between rectilinear lengths and the arcuate support.
Figure 4:
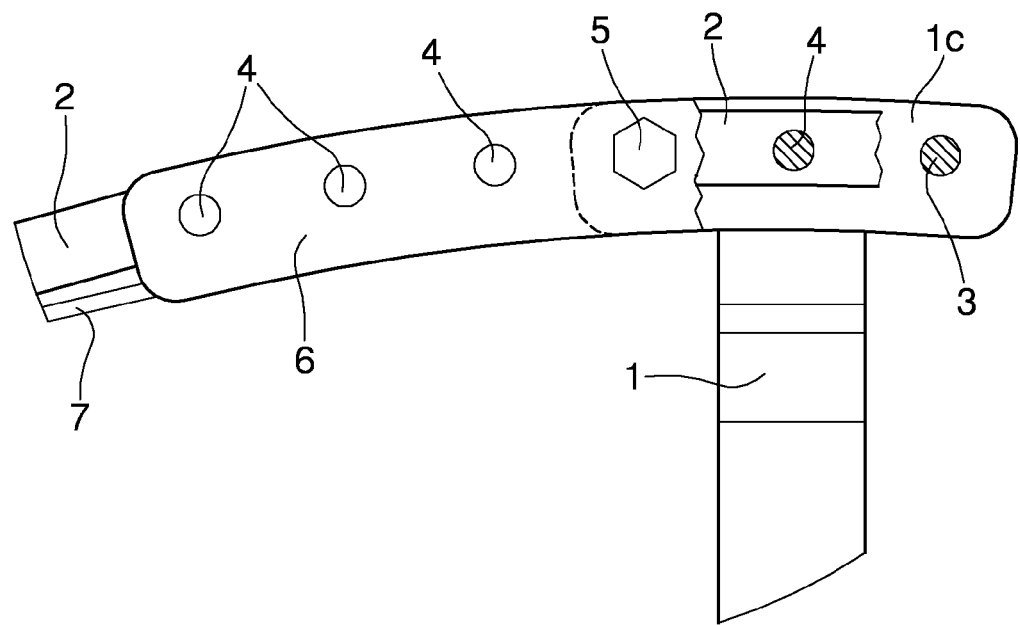
FIG. 4 shows an enlarged view of a detail B of FIG. 1 regarding the zone for connection between the arm and the arcuate support, with several parts being omitted so as to highlight others more clearly.

First of all, it should be noted that the horizontal and vertical arrangements, as well as the low and high positions, refer to a support positioned on a farm vehicle resting on horizontal ground.

The support for a mudguard constituting the object of the invention is used particularly for a mudguard designed to partially cover a wheel of a farm vehicle, such as a tractor; the mudguard and the wheel of the tractor are not shown in the figures.

The support at hand comprises an L-shaped arm 1 that is normally realized using a metal section bar. A first end 1a of the arm 1 is connected to the frame 10 of the farm vehicle by means of connection means of a known type not shown in the figures; an internal zone of an arcuate support 2, to which the mudguard 12 is connected, is fastened at the second end 1b of the arm 1. As in prior-art supports, the arcuate support is normally realized using a metal section bar, usually rectangular in cross-section, and it has flattened ends equipped with holes that enable the mudguard to be fastened; as in the case of prior-art supports, it is also possible to provide the option of connecting the mudguard to a central zone of the arcuate support. The curvature of the arcuate support is the same as that of the mudguard and once the latter has been fastened, the interior of the mudguard rests on the support.

The width of the mudguard, which must cover at least the width of the wheel of the farm vehicle, is markedly greater than the width of the arcuate support and the mudguard is connected to this support in a middle position with respect to the width thereof.

The support at hand comprises removable fastening means that makes it possible to fasten the arcuate support 2 (and thus the mudguard connected to it) to the arm 1 in a position chosen from among a plurality of different positions of the internal zone of the support 2.

The removable fastening means comprises a plate 1c that is tightly fastened to the second end 1b of the arm 1 so as to prove to be disposed perpendicularly to the straight section of the arm and to be arranged vertically. The plate 1c is equipped with at least one pair of through holes 3; in the figures, the plate 1c is illustrated with three (3) through holes and with the central hole located at the inside of the section bar with which the L-shaped arm is realized.

The removable fastening means further comprises a plurality of through holes 4 that are arranged horizontally and afforded in different angled positions of the arcuate support 2. Six (6) through holes 4 are illustrated in the figures; the distance between the various through holes shall be the same as the distance existing between the through holes 3 afforded in the plate 1c so that in whatever position the arcuate support is arranged with respect to the L-shaped arm, some of the through holes 4 shall be found to be coaxial with the through holes 3 afforded on the plate 1c. The diameters of the various through holes described are preferably identical for all holes.

The removable fastening means further comprises at least two bolts 5 that pass through an equal number of said through holes 4 so as to fasten the arcuate support 2 to the holes 3 afforded on the plate 1c, and thus to the second end 1b of the arm 1. In the illustrated embodiment, screws will be inserted in the holes corresponding to the side holes in the plate 1c and lock nuts will be connected to the screws; the central hole of the fastening plate, which is not accessible from the outside, shall be threaded instead and a screw inserted in the corresponding hole 4 will be tightened thereto.

To prevent the presence of the holes from weakening the perforated zone of the arcuate support 2, two reinforcing plates 6 are provided and securely connected, for example by means of welding, on opposite sides of the arcuate support 2 so as to cover the plurality of through holes 4; the two plates 6 are arranged facing each other and in a vertical position.

On each one of the reinforcing plates, through holes are afforded coaxial with the plurality of through holes afforded on the arcuate support; in other words, a reinforced zone with through holes passing through it is afforded on the arcuate support 2.

By means of the connection means described, arrangement of the mudguard connected to the arcuate support in an angled position turned more to the right or to the left with respect to the wheel of a farm vehicle proves to be extremely simple; in fact, inserting the bolts in either of the through holes 4 is sufficient to change the angled position of the arcuate support (and thus of the mudguard) with respect to the L-shaped arm, and thus with respect to the wheel of the farm vehicle.

The support constituting the object of the invention further comprises rectilinear lengths 7 that are welded inferiorly to the arcuate support 2 so as to form a polygonal reinforcement structure; these lengths are normally realized by means of small metal straps that are welded to the arcuate support at the corners of the polygonal structure. This structure can clearly be realized also with a single small strap folded at the corners of the structure.

At the weld points the lengths 7, or the corners of the polygonal structure, have concavities 7a that are filled with the filler material for welding; it has been found that with this measure, the polygonal reinforcement structure and its points of connection with the arcuate support 2 are stronger and less subject to accidental breakage due to vibrations generated during movement of the vehicle for which the support constituting the object of the invention is intended.

In the support at hand the arcuate support that supports the mudguard which is intended to overlie the wheel, has a shape that is concentric with the wheel and a width that is such as to overlie the wheel itself with an angle of a magnitude of at least 90°; in this manner, it is possible to pair the support with a mudguard that covers the wheel with a very wide angle, without the mudguard having overhanging ends projecting for a considerable length from the arcuate support; in fact, in the case of overhanging ends of the mudguard projecting from the arcuate support, the longer the projecting section is, the weaker and more prone to breakage the overhanging ends are.

The invention claimed is:

1. An improved support for a mudguard, of the type comprising an L-shaped arm (1) whereto the frame of a farm vehicle is connected at a first end (1a) thereof and an internal zone of an arcuate support (2), whereto the mudguard is connected, is fastened at a second end (1b) thereof, characterized in that it comprises removable fastening means suitable for fastening the arcuate support (2) to the arm (1) in a position chosen from among a plurality of different positions on the internal zone of the support (2), and wherein said removable fastening means comprises: a plate (1c), tightly fastened to the second end (1b) of the arm (1) perpendicularly to the straight section of the arm so as to be arranged vertically, said plate (1c) being equipped with at least one pair of through holes (3); a plurality of through holes (4) arranged horizontally and afforded in different angled positions of the arcuate support (2); and at least two bolts (5) that pass through an equal number of said through holes (4) so as to fasten the arcuate support (2) to the holes (3) afforded on the plate (1c).

2. The support according to claim 1, characterized in that it comprises two reinforcing plates (6) that face each other and are in a vertical position and securely connected to the arcuate support (2) so as to cover the plurality of through holes (4); on each one of the reinforcing plates, through holes are afforded coaxial with the plurality of through holes (4) afforded on the arcuate support (2).

3. The support according to claim 1, characterized in that it comprises rectilinear lengths (7) that are welded inferiorly to the arcuate support (2) so as to form a polygonal reinforcement structure; at the weld points the lengths (7) have concavities (7a) that are filled with the filler material for welding.

4. The support according to claim 1, characterized in that the width of the arcuate support supporting the mudguard which is intended to overlie the wheel, has a shape that is concentric with the wheel and overlies the wheel with an angle of a magnitude of at least 90°.

\* \* \* \* \*